United States Patent [19]

Kamimura

[11] Patent Number: 5,308,165
[45] Date of Patent: May 3, 1994

[54] END BLOCK OF A LINEAR MOTION GUIDE UNIT

[75] Inventor: Akihiko Kamimura, Yokosuka, Japan

[73] Assignee: Nippon Thompson Co., Ltd., Japan

[21] Appl. No.: 858,833

[22] Filed: Mar. 27, 1992

[30] Foreign Application Priority Data

Mar. 29, 1991 [JP] Japan .................. 3-27858[U]

[51] Int. Cl.⁵ .............................................. F16C 29/06
[52] U.S. Cl. ..................................................... 384/45
[58] Field of Search ............................ 384/43, 44, 45;
464/168

[56] References Cited

U.S. PATENT DOCUMENTS 4,934,834  6/1990  Morita ..................................... 384/45
5,102,235  4/1992  Mugglestone .......................... 384/45
5,139,347  8/1992  Hattori ................................... 384/45

Primary Examiner—Lenard A. Footland
Attorney, Agent, or Firm—Skjerven, Morrill, MacPherson, Franklin & Friel

[57] ABSTRACT

An end block defining a part of a slider of a linear motion guide unit is provided. The end block includes a rib structure fabricated in a desired shape from a first resin material by injection molding. The rib structure is provided with a rib system including a plurality of ribs, preferably, arranged in the form of a grid to thereby define a plurality of void spaces or recesses and also with at least one curved connecting path section of an endless circulating path provided in the guide unit. A filing material preferably of a second resin material is provided in at least one of the plurality of recesses. The second resin material preferably has a viscous characteristic after hardening.

20 Claims, 6 Drawing Sheets

END BLOCK OF A LINEAR MOTION GUIDE UNIT

BACKGROUND OF THE INVENTION

1. Field of the Invention

This invention generally relates to a linear motion guide unit and in particular to improvements in an end block of a linear motion guide unit.

2. Description of the Prior Art

A linear motion guide unit is well known in the art and it generally includes a rail extending over a length, a slider slidably mounted on the rail and a plurality of rolling members interposed between the rail and the slider. One prior art example of such a linear motion guide unit using rollers as the rolling members is illustrated in FIG. 10 and another prior art example using balls as the rolling members is illustrated in FIG. 11. That is, as shown in FIG. 10, a linear motion guide unit includes a rail 5 extending over a desired length and provided with a pair of inner guide grooves, formed on its opposite side surfaces, a slider 1 slidably mounted on the rail 5 and formed with a pair of outer guide grooves each located opposite to and spaced apart from a corresponding one of the pair of inner guide grooves of the rail to thereby define a pair of guide channels and a plurality of rollers 7. The linear motion guide unit shown in FIG. 10 is of the so-called indefinite type so that a pair of endless circulating paths is provided in the slider 1, each, of which is filled with a plurality of rollers 7. In the structure shown in FIG. 10, the rollers 7 are arranged in the so-called crossed roller arrangement so that any two adjacent rollers 7 are oriented such that their rotating axes extend perpendicular to each other when viewed in the direction of advancement.

Since the slider 1 is provided with a pair of endless circulating paths, the rollers 7 may roll along each of these circulating paths indefinitely as long as the rail 5 extends. As well known in the art, each of the endless circulating paths includes a load path section, which corresponds to a guide channel defined between a pair of associated inner and outer guide grooves, a return path section and a pair of curved connecting path sections connecting the corresponding ends of the load and return path sections.

The slider 1 typically has a three-part structure, 6 and a pair of front and end blocks 4 located at the front and rear ends of the center block, respectively. In the structure shown in FIG. 10, an end cover plate 19 is fixedly attached to each of the front and rear end blocks 4' and a grease nipple 15 is provided in the rear end block 4 for allowing to supply grease into a desired location inside the slider 1. The linear motion guide unit illustrated in FIG. 11 is similar in many respects to the linear motion guide unit illustrated in FIG. 10 excepting the fact that use is made of balls 8 in place of rollers 7.

Since the slider 1 has basically a three-part structure as described above, the center and end blocks 6 and 4 are separately fabricated and then they are assembled together as the slider 1. The front and end blocks 4 are fabricated substantially identical in structure. As best shown in FIG. 12, the end block 4' either front or rear, is formed with a curved connecting path section 2 of an endless circulating path. Thus, the rollers 7 may move from the load path section to the return path section or vice versa through each of the pair of curved connecting path sections 2.

Such an end block is typically fabricated from a resin material, for example, by injection molding. In such a case, however, in order to attain a desired accuracy in manufacture, it is desired that the end block 4 be uniform in thickness as much as possible. However, since the end block 4 must be formed with a curved connecting path section of an endless circulating path as described above, the end block 4 is typically constructed to have a grid-shaped rib structure 13 as best shown in FIG. 1. Because of the provision of such a grid-shaped rib structure 13, a number of recesses 3 are defined.

However, the provision of such a number of recesses 3 tend to degrade the structural integrity of the end block 4 and in the worst case the end block 4 may distort or suffer damage under severe use conditions, such as application of a relatively large load. In addition, these recesses 3 have been found to be a source of relatively large noise which is created when the slider 4 slides along the rail 5. In particular, when the rollers 7 or balls 8 roll along the curved connecting path section of an endless circulating path, the rattling noise appears to be amplified due to the presence of such a large number of recesses 3.

SUMMARY OF THE INVENTION

In accordance with the present invention, there is provided an improved end block for use in a linear motion guide unit. The present end block includes a rib structure comprised of a first resin material to define a plurality of recesses and at least one of the recesses is filled with a second resin material. In the preferred embodiment, the rib structure generally has a grid shape and the second resin material differs from the first resin material. Preferably, the rib structure is fabricated by injection molding and the second rein material is filled into one or more of the recesses defined in the rib structure.

It is therefore a primary object of the present invention to provide an improved end block for use in a linear motion guide unit.

Another object of the present invention is to provide an improved end block for use in a linear motion guide unit having an increased structural integrity.

A further object of the present invention is to provide an improved end block for use in a linear motion guide unit having an increased noise suppression capability.

A still further object of the present invention is to provide an improved linear motion guide unit high in structural integrity and free of noise.

Other objects, advantages and novel features of the present invention will become apparent from the following detailed description of the invention when considered in conjunction with the accompanying drawings.

DESCRIPTION OF THE PREFERRED EMBODIMENTS

Figure 1:
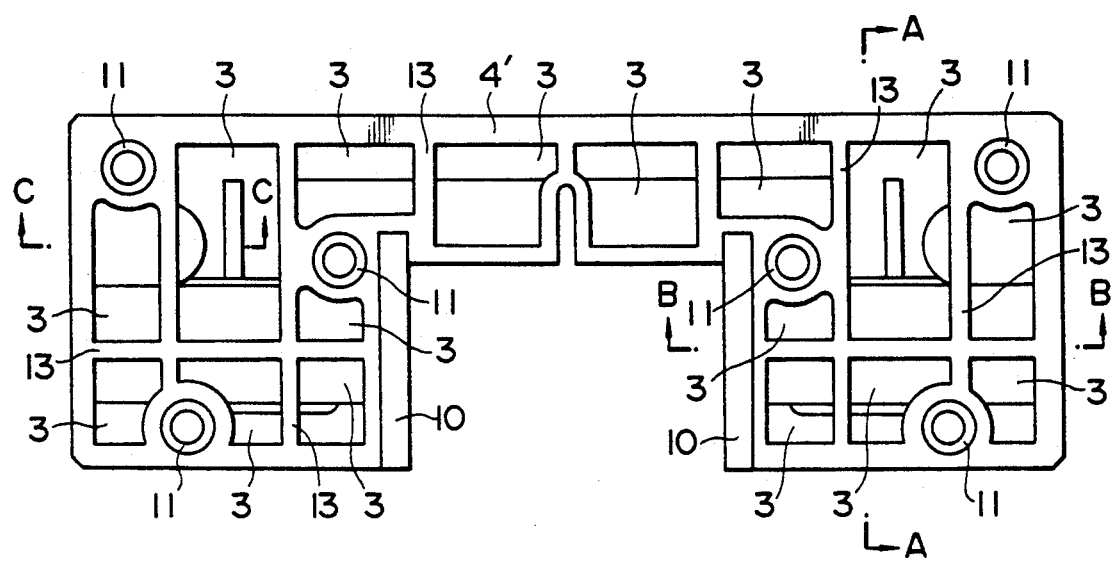
FIG. 1 is a schematic illustration showing in front view the rib structure of an end block constructed in accordance with one embodiment of the present invention.
Figure 2:
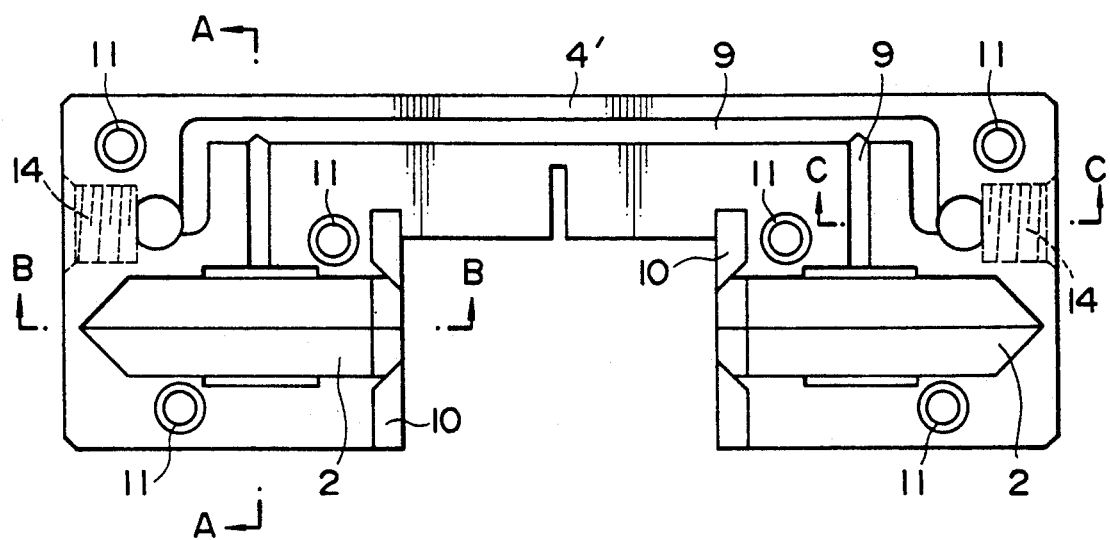
FIG. 2 is a schematic illustration showing in rear view the rib structure of FIG. 1.

Referring now to FIG. 1, there is shown in front view a rib structure 4' which defines a basic structure of an end block of the present invention. The rib structure 4' is preferably fabricated from a first resin material, for example, by injection molding. FIG. 1 shows the front end surface of the rib structure 4' on which a cover plate 19 will be fixedly attached later. On the other hand, FIG. 2 shows the rear end surface of the rib structure 4' opposite to the front end surface shown in FIG. 1. Thus, the rear end surface of the rib structure 4' shown in FIG. 2 will be brought into contact with one end surface of a center block when assembled into a slider 1.

Figure 6:
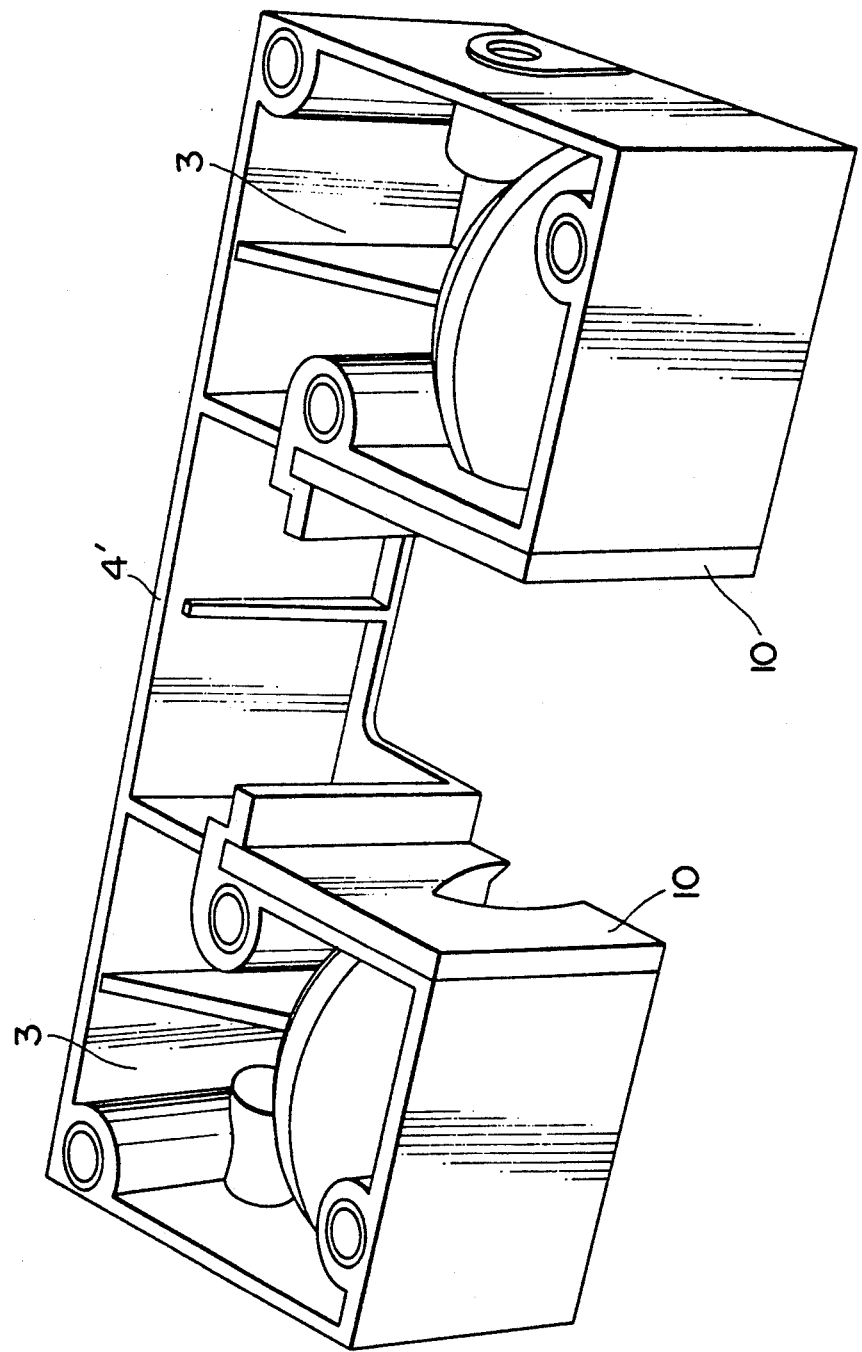
FIG. 6 is a schematic illustration showing in perspective view the rear end of the rib structure of FIG. 1.

As shown in FIG. 2, the rib structure 4' is generally U-shaped in cross section and provided with a pair of curved connecting path sections 2, each of which defines a part of an associated endless circulating path. The rear end surface of the rib structure 4' is provided with an oil groove system 9 which is in communication with each of a pair of nipple holding holes 14 into which an associated grease nipple may be snugly fitted. The oil groove system 9 is also in communication with each of the curved connecting path sections 2 so that the oil or grease may be supplied into each of the curved connecting path sections 2 from the exterior through the oil groove system 9. Also fixedly provided in the rib structure 4' is a plurality of threaded collars 11 into each of which a mounting bolt may be threaded when assembled with the center block 6. These threaded collars 11 are preferably provided in the mold cavity as inserts when the rib structure 4' is fabricated by injection molding. The rib structure 4 is also provided with a pair of guide plates 10, each associated with a corresponding one of the curved connecting path sections 2. As best shown in FIG. 6, the guide plate 10 has a particularly shaped cut-away section defining a guide section for guiding the rolling members from or toward the associated one of the load and return path sections.

Referring back to FIG. 1, there is shown the front end surface of the rib structure 4' opposite to the rear end surface shown in FIG. 2, and, as shown, the rib structure 4' is provided with a generally grid-shaped rib system 13. Because of the provision of such a grid-shaped rib system 13, there is created a number of void spaces or recesses 3. The provision of such a rib system 13 is necessary in order to keep the thickness of the rib structure 4' uniform as much as possible so as to avoid the occurrence of distortion hen manufactured, for example, by injection molding. Although a grid-shaped rib system 13 is shown in FIG. 1 as one embodiment of the present invention, the present invention should not be limited only to such a particular grid system and a grid system of having any other shape may also be used in the present invention.

Figure 3:
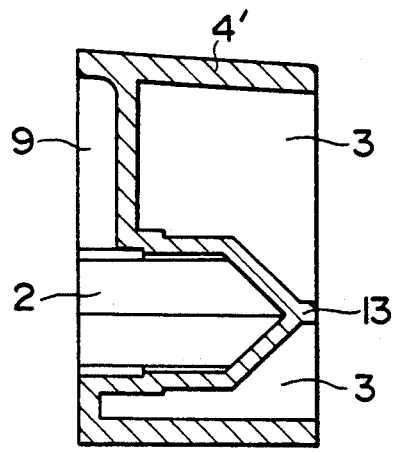
FIG. 3 is a schematic illustration showing the cross section taken along line A—A indicated in FIGS. 1 and 2.
Figure 4:
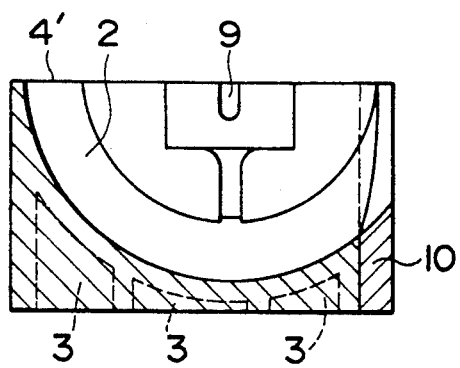
FIG. 4 is a schematic illustration showing the cross section taken along line B—B indicated in FIGS. 1 and 2.
Figure 5:
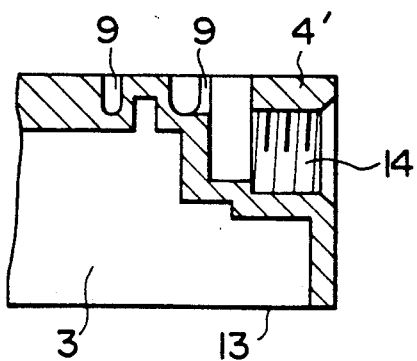
FIG. 5 is a schematic illustration showing the cross section taken along line C—C indicated in FIGS. 1 and 2.

FIGS. 3 through 5 illustrate how the void spaces or recesses 3 are defined by the rib system 13 defined in the rib structure 4'. As shown in FIG. 3, two recesses 13 are defined by the provision of a rib system 13 in the front end side of the rib structure 4'. The rear end side of the rib structure 4' is provided with an oil groove system 9 which extends downward to be in fluidic communication with the curved connecting path section 2 of an endless circulating path. FIG. 4 clearly illustrates the curved connecting path section 2 having one end connected to the guide plate 10 so as to provide a smooth transitional path between the curved connecting path section 2 and its associated load path section. Thus, the other end of the curved connecting path section 2 is connected to one end of an associated return path section (not shown). In FIG. 4 also, three recesses 3 are defined by the rib system provided in the present rib structure 4'.

Figure 7:
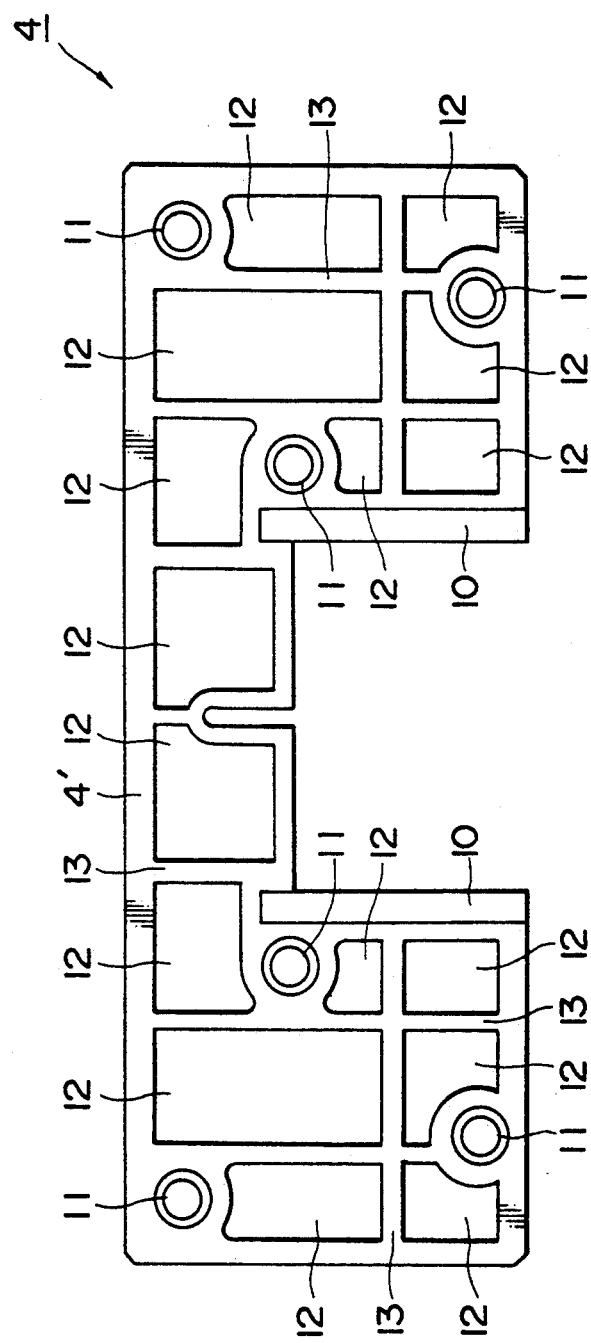
FIG. 7 is a schematic illustration showing in front view an end block constructed by filling each of the recesses in the rib structure of FIG. 1 with a resin material in accordance with one embodiment of the present invention.
Figure 8:
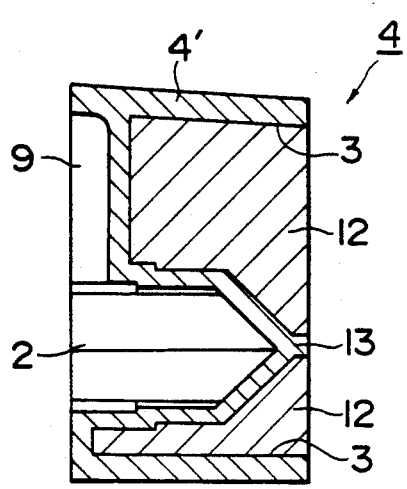
FIG. 8 is a schematic illustration showing a cross section corresponding to the cross section of FIG. 3 with its recesses filled with a resin material.
Figure 9:
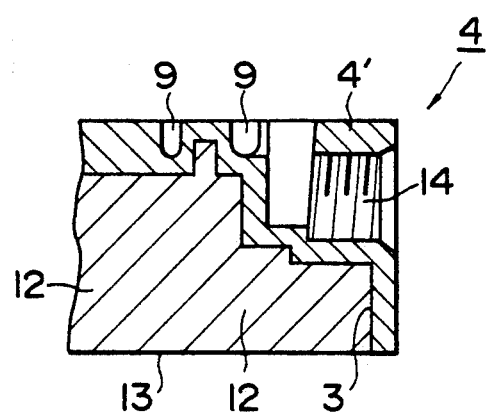
FIG. 9 is a schematic illustration showing a cross section corresponding to the cross section of FIG. 5 with its recesses filled with a resin material.
Figure 10:
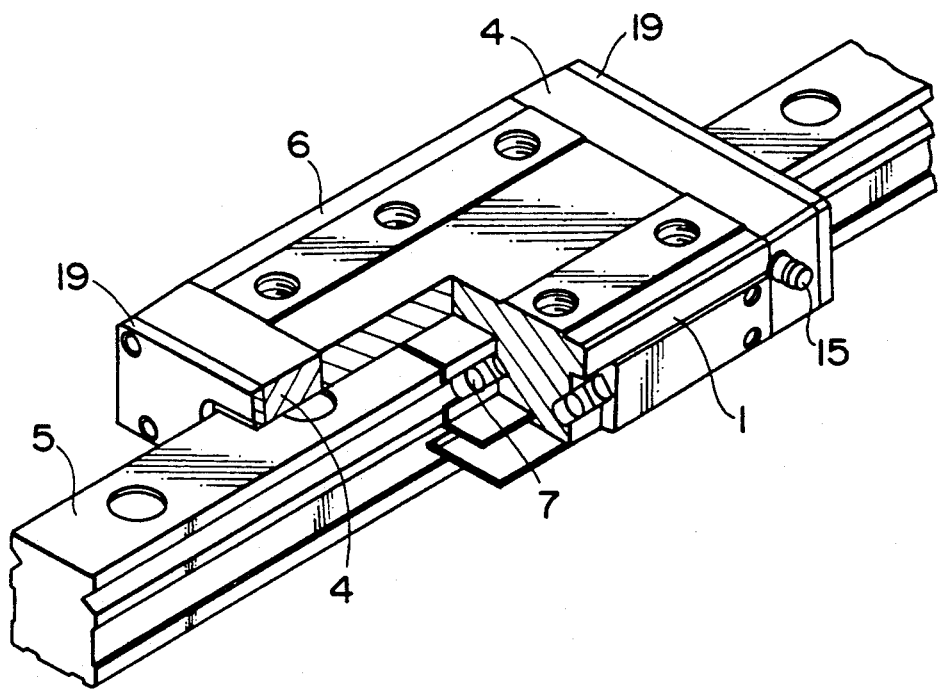
FIG. 10 is a schematic illustration showing in perspective view a prior art linear motion guide unit using rollers as rolling members.
Figure 11:
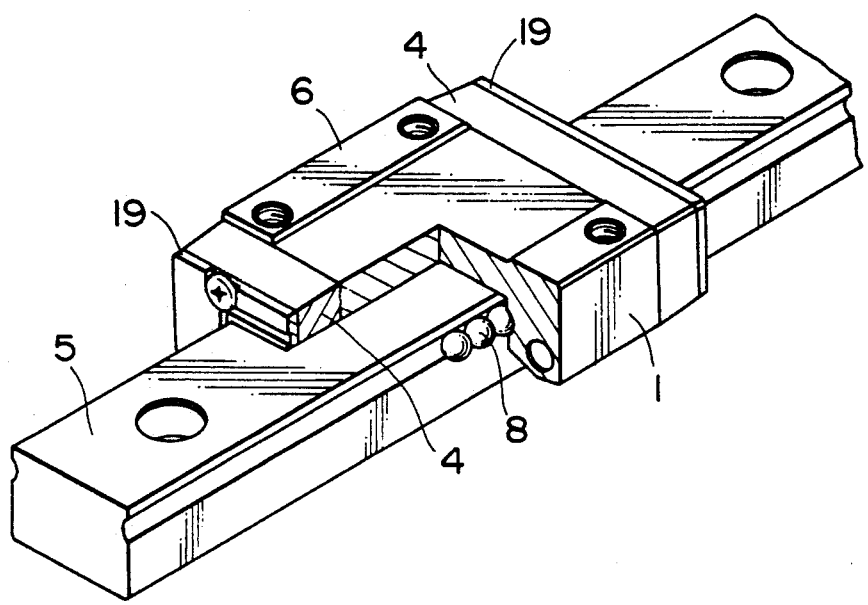
FIG. 11 is a schematic illustration showing in perspective view another prior art linear motion guide unit using balls as rolling members.

In accordance with the present invention, one or more of these void spaces or recesses 3 defined by the provision of the rib system 13 is filled with a filling material. In the preferred embodiment, all of the recesses 3 are filled with a second resin material 12 which is different from the resin material used for fabricating the rib structure 4' as shown in FIGS. 7 through 9. The filling material 12 is preferably a viscous resin material which hardens after filling and which has a viscous characteristic after hardening, such as plastic steel. Such a resin filling material is typically a mixture of a resin and metal powder and hardens rapidly after having been supplied to fill a space. Such a resin filling material is well know to those skilled in the art and any resin materials may be used in the present invention.

Figure 12:
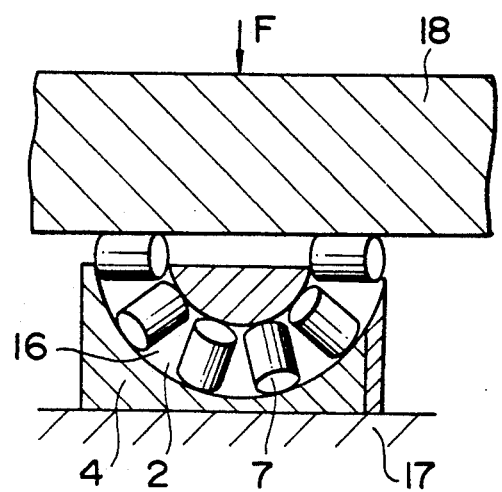
FIG. 12 is a schematic illustration showing the condition of a durability test of the present end block.

Since the recesses 3 of the rib structure 4' are filled with a filling material 12 to define an end block 4' the resulting end block 4 has an increased structural integrity or strength. FIG. 12 illustrates one possible test setup for testing the structural integrity of the present end block 4. As shown in FIG. 12, the end block 4 is placed on a bench 17 with its rear end surface facing upward and with its curved connecting path section 2 filled with a plurality of rollers 7 (or balls 8 as the case may be). Then, a pressure plate 18 is placed on the end block 4 and a static load F is applied to the pressure plate 18 downward. As a result of comparative experiments between the prior art end block and the present end block using the test setup shown in FIG. 12, it has been found that the critical static load when breakage occurs to the end block has been increased by the factor of 1.4 and the amount of displacement of the pressure plate 18 at the critical static load has been decreased by 30% for the present end block.

In addition, since the recesses 3 have been eliminated by filling them with a filling material 12, there is a decreased tendency to create and/or amplify noise so that there can be obtained a linear motion guide unit substantially free of noise. Furthermore, if use is made of a resin filling material, since it is relatively lighter in weight, it does not add much of a weight to the slider 6 so that the overall weight of the slider 6 can be maintained at a relatively low level. Thus, the operating speed of a linear motion guide unit is not significantly impaired by the application of the present end block.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An end block for use as a part of a slider of a linear motion guide unit, comprising:
   a rib structure of a predetermined shape and comprised of a first resin material, said rib structure including at least one curved connecting path section of an endless circulating path provided in said guide unit and a rib system which defines a plurality of recesses; and
   a filling material provided in at least one of said plurality of recesses.

2. The end block of claim 1, wherein said filling material includes a second resin material.

3. The end block of claim 2, wherein said second resin material is different from said first resin material in composition.

4. The end block of claim 1, wherein said rib structure is fabricated by injection molding.

5. The end block of claim 1, wherein said rib system includes a plurality of ribs arranged generally in the shape of a grid.

6. The end block of claim 5, wherein all of said plurality of ribs are substantially uniform in thickness.

7. The end block of claim 1, wherein said end block is generally rectangular in shape and has a first end surface and a second end surface opposite to said first end surface and wherein said at least one curved connecting path section is provided in said first end surface and said rib system is provided in said second end surface.

8. A linear motion guide unit, comprising:
   a rail extending over a length;
   a slider slidably mounted on said rail, said slider including a center block and a pair of end blocks each fixedly attached to a corresponding end of said center block, each of said end blocks including a rib structure provided with a plurality of recesses and a filling material provided in at least one of said plurality of recesses; and
   a plurality of rolling members interposed between said rail and said slider.

9. The guide unit of claim 8, wherein said rib structure includes a first resin material and said filling material includes a second resin material different from said first resin material.

10. The guide unit of claim 9, wherein said rib structure includes a rib system comprised of a plurality of ribs and said plurality of recesses are defined by said rib system.

11. The guide unit of claim 10, wherein said plurality of ribs are substantially uniform in thickness and generally arranged in the shape of a grid.

12. The guide unit of claim 9, wherein said first resin material is a material suitable for use in injection molding and said second resin material is a viscous resin material which has a viscous characteristic after hardening.

13. The guide unit of claim 12, wherein said second resin material is a mixture of a resin and metal powder.

14. The guide unit of claim 12, wherein said second resin material is plastic steel.

15. An end block for use as a part of a slider of a linear motion guide unit, said end block comprising:
   a rib structure of a predetermined shape and comprised of a first resin material suitable for use in injection molding, said rib structure including at least one curved connecting path section of an endless circulating path provided in said guide unit and a rib system which defines a plurality of recesses; and
   a filling material provided in at least one of said plurality of recesses;
   wherein said filling material includes a second resin material different from said first resin material, and wherein said second resin material is a viscous resin material which has a viscous characteristic after hardening.

16. The end block of claim 15 wherein said second resin material is a mixture of a resin and metal powder.

17. The end block of claim 15 wherein said second resin material is plastic steel.

18. A linear motion guide unit comprising:
   a rail extending over a length;
   a slider slidably mounted on said rail, said slider including a center block and a pair of end blocks each fixedly attached to a corresponding end of said center block, each of said end blocks including a rib structure provided with a plurality of recesses and a filling material provided in at least one of said plurality of recesses; and
   a plurality of rolling members interposed between said rail and said slider;
   wherein said rib structure includes a first resin material and said filling material includes a second resin material different from said first resin material; and
   wherein said first resin material is a material suitable for use in injection molding and said second resin material is a viscous resin material which has a viscous characteristic after hardening.

19. The guide unit of claim 18 wherein said second resin material is a mixture of a resin and metal powder.

20. The guide unit of claim 18 wherein said second resin material is plastic steel.

* * * * *